Figure 1:
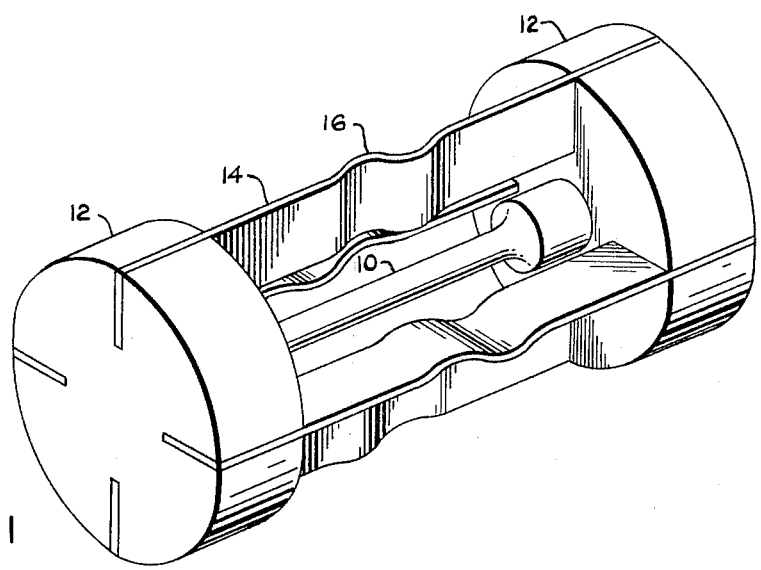

Sept. 13, 1966          W. A. JONES          3,272,492

TRANSVERSELY SUPPORTED TORSION BAR

Filed March 11, 1964

INVENTOR.
WILLIAM A. JONES
BY
*Kenway, Jenney & Hildreth*
ATTORNEYS 3,272,492
TRANSVERSELY SUPPORTED TORSION BAR
William A. Jones, Boston, Mass., assignor to Northrop Corporation, Beverly Hills, Calif., a corporation of California
Filed Mar. 11, 1964, Ser. No. 350,953
3 Claims. (Cl. 267—1)

This invention relates to torsional springs, and more particularly to an improvement in transversely supported torsion bars.

According to U.S. Patent 3,081,991, issued March 19, 1963, to Edward L. Swainson, and assigned to the assignee of the present application, a torsion bar is connected between a pair of enlarged hubs, and being relatively flexible in a direction transverse to its longitudinal axis, is supported against deflection in that sense by a plurality of leaf springs circumferentially spaced about the torsion bar and rigidly secured at their opposite ends in the hubs. These leaf springs comprise flat strips whose major surfaces lie in planes radial to the torsional axis of the torsion bar, and therefore have a relatively low spring rate in torsion about that axis. As compared with a conventional solid cylindrical torsion bar of sufficient stiffness to support similar transverse loading, this assembly showed improved linearity of response and reduction in hysteresis effects. The torsion bar provides the principle resistance to torsional deflection about its axis, while the leaf springs provide the principle resistance to transverse deflection.

However, the application of torque to the unit produces not only an axial contraction of the torsion bar, but also a lengthening of the leaf springs, which applies an axial compression load to the torsion bar. This compression loading is caused by the leaves contracting axially at a different rate than the torsion bar. Further, the flat leaves sustain a combination of bending and twisting forces which detracts from the linearity of response of the unit. As the unit is placed in torsion, the radially-outer edge of each leaf is displaced circumferentially farther than the inner edge, and is consequently stretched further. The differential in stress causes an oil-canning action.

It is the primary object of my invention to improve the compliance to axial contraction of a transversely supported torsion bar. It is a further object to increase the linearity of response of a transversely supported torsion bar, and to reduce hysteresis effects. A further object is to reduce oil-canning of the leaves of the assembly. Further objects and advantages of the invention will appear as the following description proceeds.

In a preferred form, I carry out the invention by forming a torsion bar assembly of leaf springs which have transverse corrugations to reduce their resistance to axial stretching, without reducing their stiffness under transverse loadings. The corrugations comprise a series of return bends protruding oppositely from the planes of the major surfaces of the leaf springs, which major surfaces preferably lie in planes radial to the torsional axis of the assembly. The torsional spring assembly is consequently compliant to axial contraction of the torsion bar concomitant with the imposition of an applied torque, because the leaf springs are relatively free to stretch longitudinally, and impose a reduced resistance to torsion of the assembly.

In one embodiment, the transversely-corrugated leaf springs are combined with a conventional cylindrical torsion bar, which is arranged along the torsional axis of the unit. The leaves are spaced circumferentially about the axis, with their major surfaces lying in radial planes. The axial compression imposed on the torsion bar by the stretching of the leaf springs is materially reduced, and this avoids bowing of the torsion bar from true concentricity with the torsional axis. The resulting torsional spring assembly exhibits improved linearity of response and freedom from hysteresis effects.

Figure 2:
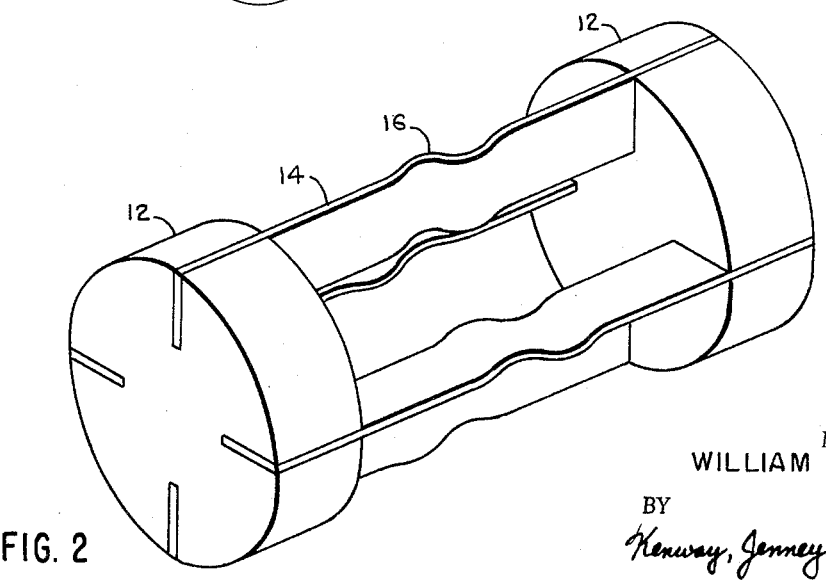

While the specification concludes with claims distinctly pointing out the subject matter which I regard as my invention, it is believed that a clearer understanding may be gained by the following detailed description of a preferred embodiment thereof, referring to the accompanying drawing, in which:

FIG. 1 is a view in perspective of one form of torsional spring assembly according to the invention; and FIG. 2 is a similar view of another form of the invention.

Referring to FIG. 1, a first embodiment of the invention includes a relatively long torsion bar 10 of cylindrical configuration, having at each end an integrally formed massive, cylindrical hub 12. In another form shown in FIG. 2, the torsion bar is omitted, but the structure is otherwise similar. The torsion bar and hubs may be substantially as shown and described in the aforementioned U.S. Patent No. 3,081,991, and no further detailed description thereof is believed necessary. Spaced longitudinal slots are cut radially into the hubs at 90° intervals, in such a manner that the slots in one hub are aligned with the slots in the other when the assembly is free of torque. Extending between the hubs are a plurality of transverse supporting members in the form of leaf springs 14, having their respective terminal portions projecting into opposite aligned slots and firmly affixed to the hubs by any suitable means, such as soldering, welding, or the like. The number of springs may be varied to suit any particular requirement.

According to the present improvement, the leaf springs 14 are formed from flat strips, but are provided with transverse corrugations 16 protruding in opposite circumferential directions from the planes of the major surfaces thereof. Since the depths of the beams constituted by the springs are not altered in the radial dimension by the presence of the corrugations, the transverse stiffness of the assembly is unimpaired. However, the stress required to elongate the strips slightly is very greatly reduced, so that as one hub is rotated with respect to the other, the springs elongate freely. This increased compliance imposes a materially reduced compressional loading on the torsion bar when the unit of FIG. 1 is subjected to twisting. This minimizes any tendency to bow or buckle the torsion bar from true concentricity with its axis.

In either embodiment, the radially inner and outer portions of the strips are relatively free to expand axially by unequal amounts, and the differential stress is thereby greatly reduced, so that oil-canning is reduced or eliminated. Reduction of hysteresis effects and improved linearity of response are characteristics of the assembly.

The construction described offers great freedom in design. The optimum quantity and form of the corrugations may be determined by considerations of the angular range of operational deflection, torsional and transverse stiffness required, required linearity, and the like. It is to be noted that the corrugated design of the leaf springs also avoids the possibility of "oil can" snap action which might occur if flat springs were subjected in practice to compression between the hubs. Consequently it is unnecessary to mount the leaf springs of the improved design under tension, as is desirable when flat springs are used. The improved design lends itself to substantially the same flexibility in mode of construction as the assembly of the aforementioned patent.

Those skilled in the art will readily appreciate that modifications of the illustrated embodiments may be made without departing from the true spririt and scope of the invention, which I therefore intend to define in the appended claims without limitation to the details of the particular embodiments which have been shown and described by way of illustration.

What I claim as new and desire to secure by Letters Patent of the United States is:

1. A torsional spring assembly, comprising a torsion bar having a relatively high spring rate in torsion and being relatively flexible transversely of a longitudinal axis thereof, a pair of hubs secured axially on opposite ends of said bar for rotation relative to one another, and a plurality of leaf springs circumferentially-spaced about said bar and rigidly secured at opposite ends thereof in said hubs, said springs being relatively stiff transversely of said axis, having a relatively low spring rate in torsion about said axis, and comprising transversely-corrugated strips having relatively low resistance to axial stretching and therefore being compliant with relative rotation of said hubs to torque said torsion bar about said axis.

2. A torsional spring assembly as recited in claim 1, in which each of said leaf springs comprises a flat strip having a portion thereof corrugated by a plurality of return bends protruding from the planes of the major surfaces of said flat strip.

3. A torsional spring assembly as recited in claim 2, in which uncorrugated portions of said flat strips lie in planes substantially radial to said axis of said torsion bar.

References Cited by the Examiner

UNITED STATES PATENTS

| | | | |
|---|---|---|---|
| 988,742 | 4/1911 | Stauber | 64—15 |
| 1,379,964 | 5/1921 | Chilton | 64—15 |

ARTHUR L. LA POINT, *Primary Examiner.*

W. B. WILBER, *Assistant Examiner.*